Dec. 2, 1969  B. YELLIN  3,481,285
PALLET WHICH IS INTEGRALLY MOLDED
OF A PLASTIC MATERIAL OR THE LIKE
Filed March 7, 1968  2 Sheets-Sheet 1

Inventor
Bernard Yellin.
By Max R. Kraus
Atty

Dec. 2, 1969                  B. YELLIN              3,481,285
PALLET WHICH IS INTEGRALLY MOLDED
OF A PLASTIC MATERIAL OR THE LIKE
Filed March 7, 1968                                2 Sheets-Sheet 2
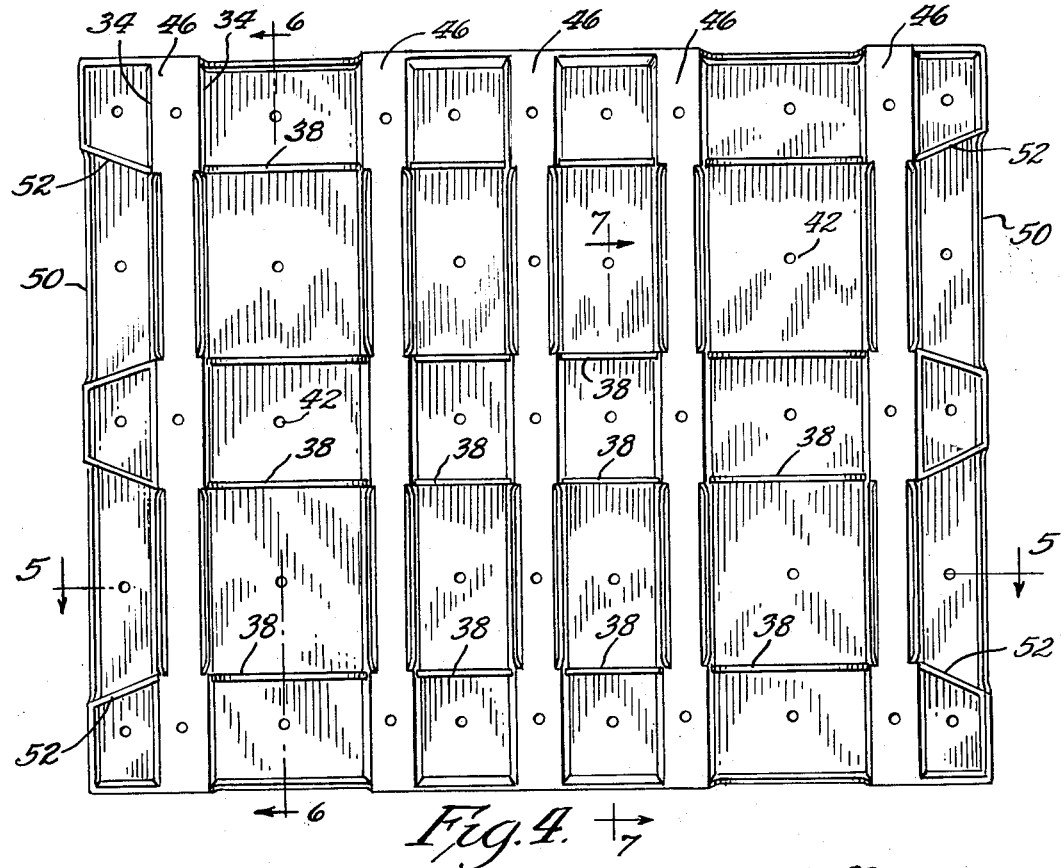
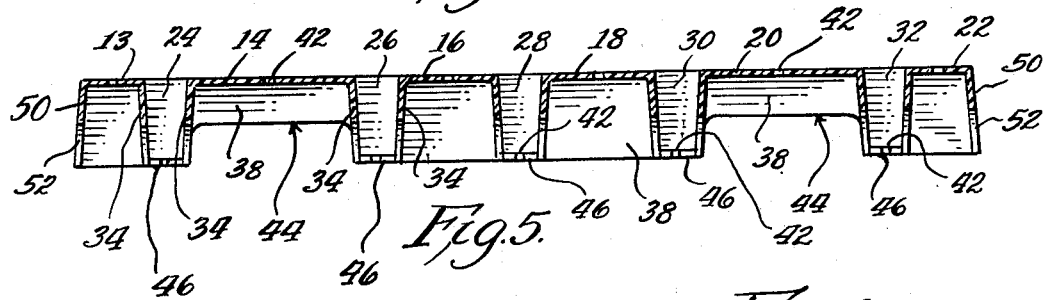
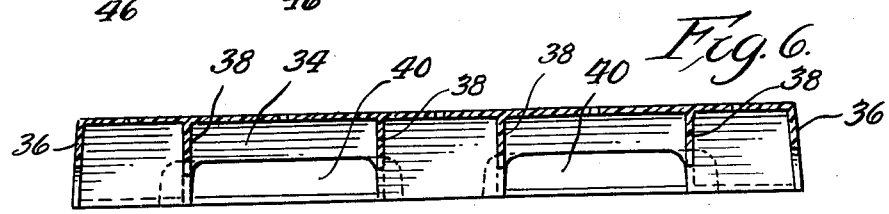
Inventor
Bernard Yellin
By Max R. Kraus
Atty.

United States Patent Office 3,481,285
Patented Dec. 2, 1969

---

3,481,285
PALLET WHICH IS INTEGRALLY MOLDED OF A PLASTIC MATERIAL OR THE LIKE
Bernard Yellin, 5252 S. Kolmar Ave., Wilmette, Ill. 60091
Filed Mar. 7, 1968, Ser. No. 711,348
Int. Cl. B65d 19/24, 19/38
U.S. Cl. 108—58                4 Claims

ABSTRACT OF THE DISCLOSURE

A pallet integrally molded of a plastic or like material comprising a top surface having longitudinally and transversely extending ribs which extend below the top surface, with the ribs having recessed portions or openings which permit the forks of a lift truck to be inserted into said recesses under the pallet from either of the opposite sides or ends whereby said pallet may be lifted with the material resting on said pallet.

This invention relates to a pallet which is integrally molded of a plastic material or the like.

SUMMARY OF THE INVENTION

One of the objects of this invention is to provide a pallet which may be injection molded of plastic or like material in a single operation so that the entire pallet is an integral unit reinforced with ribs to provide sturdiness. It has means to receive the forks of a lift truck from either of the opposite ends or sides of the pallet.

Another object of this invention is to provide a single integrally formed pallet which may be economically and expeditiously produced.

Other objects will become apparent as this description progresses.

In the drawings:

FIG. 4 is a plan view of the bottom of the pallet;

FIG. 5 is a cross-sectional view taken on line 5—5 of FIG. 4 but inverted from the position shown in FIG. 4;

FIG. 6 is a sectional view taken on line 6—6 of FIG. 4 but in inverted position from the position shown in FIG. 4; and FIG. 7 is a sectional view taken on line 7—7 of FIG. 4 but in inverted position from the position shown in FIG. 4.

Figure 1:
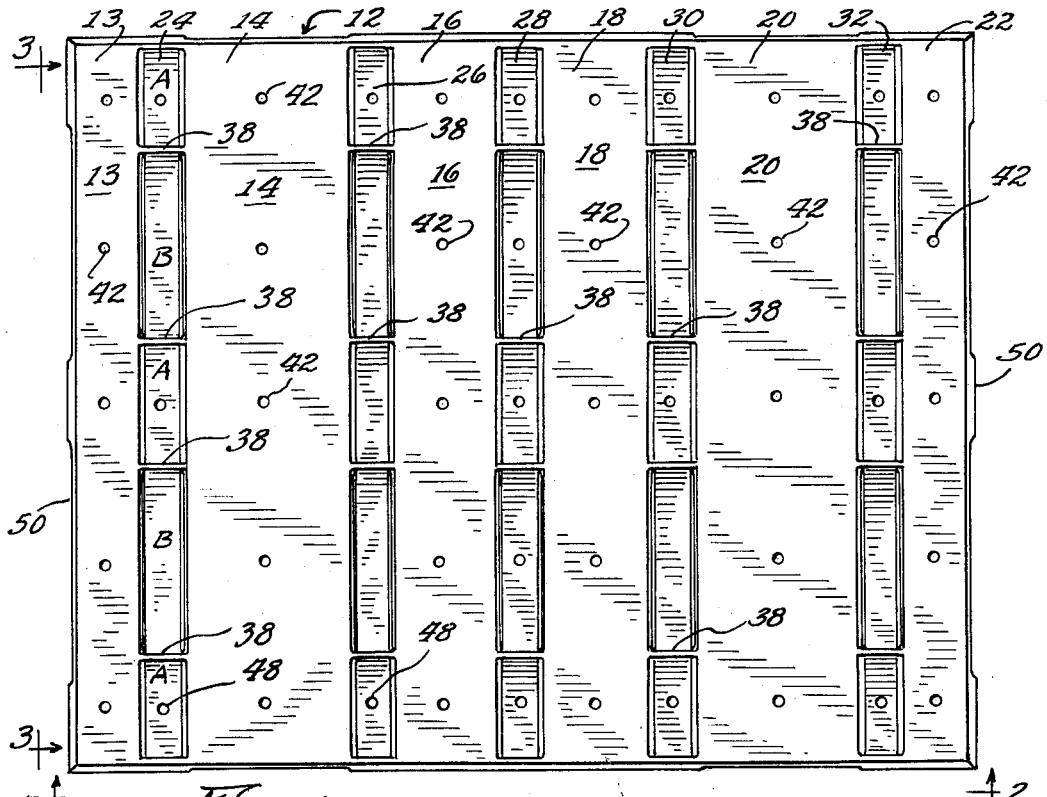
FIG. 1 is a top plan view of the pallet forming this invention.
Figure 2:
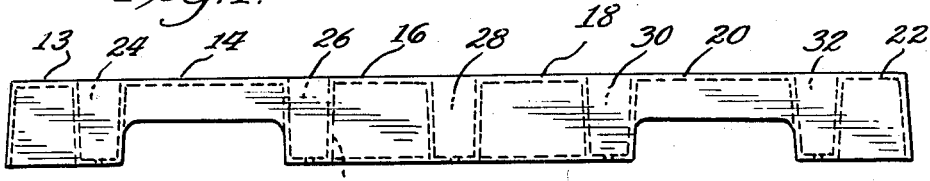
FIG. 2 is a side view taken on line 2—2 of FIG. 1.
Figure 3:
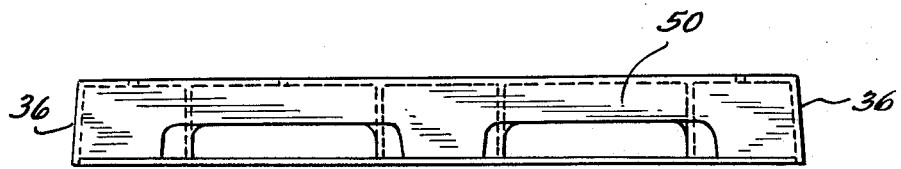
FIG. 3 is an end view taken on line 3—3 of FIG. 1.

The pallet is integrally formed or molded and is produced by an injection molding machine as an integral unit. It is molded preferably of a plastic material. The entire unit is designated generally by the numeral 10. The top of the unit, as best seen in FIG. 1, comprises a top planar surface generally indicated at 12 formed of a plurality of spaced top surface sections 13, 14, 16, 18, 20 and 22, with alternate open top spacing sections 24, 26, 28, 30 and 32. Certain of said top surface sections, such as those indicated by the numerals 14 and 20 have a greater width than the other top surface sections. Between the top surface sections are the alternate open top spacing sections. The top surface sections 13 through 22 at each of the opposite sides thereof have a downwardly extending rib 34, which ribs extend transversely of the pallet. All of the transversely extending ribs are identified by the numeral 34. A description of one of the top surface sections, each with two spaced transverse ribs 34 will be described. The remaining sections are identical.

The top surface sections 13 through 22 are all planar and extend transversely of the pallet and the ribs 34 extend downwardly along the opposite sides of said top surface sections and transversely of the pallet. The ribs 34 extend the full width of the pallet. The ribs extend to and are connected to the opposite side walls 36 of the pallet. All of the spaced top surface sections 13–22 are on the same plane so that whatever material is placed on the pallet rests firmly thereon. The alternate open top spacing sections 24 through 32 have spaced longitudinally extending ribs all designated by the numeral 38, presently to be described.

The transverse ribs 34 (FIGS. 6 and 7) are provided intermediate their opposite ends with recessed or formed spaces designated by the numeral 40. All of the transverse ribs 34 have their recessed spaces 40 alined to form two alined recessed spaces 40 which extend continuously of the length of the pallet so that the forks of a lift truck may be inserted into said recessed spaces from either end of the pallet whereby the pallet may be lifted by the lift truck with the material supported on said pallet.

The adjacent transverse ribs 34 are inclined inwardly slightly toward each other from the top section downwardly and the inclination can best be seen in FIG. 5. The top surface sections 13–22 are provided with spaced openings 42.

Extending longitudinally of the pallet are the longitudinal ribs 38. These longitudinally extending ribs 38 extend between the spaced transverse ribs 34 and are connected thereto. As viewed in FIG. 1, the only portions of the longitudinal ribs 38 which would be visible from the top are the portions extending in the alternate open top spacing sections 24 through 32 which are connected to the transverse ribs 34. The top edges of the longitudinal ribs 38 are on the same plane as the top surface sections 13 through 22. The longitudinal ribs 38 which extend between the transverse ribs 34 in the spacing sections 24–32 also extend below the top surface sections 14 through 20. The longitudinal ribs 38 which extend below the top surface sections are also connected to the transverse ribs 34 and to the continuation of the longitudinal ribs 38 in the spacing sections 24–32. Thus, the longitudinal ribs 38 have portions which are visible from the top (FIG. 1) and alternate portions which would be visible only from the bottom (FIG. 4).

The longitudinal ribs 38 under the two widest top surface sections 14 and 20 have recessed or formed spaces 44. All of the longitudinal ribs 38 have their recessed spaces 44 alined to form two alined recessed spaces 44 which extend continuously of the width or transversely of the pallet. The side walls 36 each have recessed spaces conforming to the recessed spaces 44 in the longitudinal ribs 38 and in alinement therewith soo that the forks of a lift truck may be inserted into said recessed spaces from either of the opposite sides of the pallet for the purpose of lifting the pallet. The longitudinal ribs 38 between the recessed portions 44 extend to the bottom of the pallet, as shown in FIG. 7.

Transverse bottom sections 46 are at the bottom of the pallet and extend along the bottom of the spacing sections 24–32. The bottom sections 46 are connected to the transverse ribs 34 and to the longitudinally extending ribs 38. The transverse bottom sections 46 are connected to the transverse ribs 34 along the length of the ribs where the transverse ribs 34 extend to the bottom. Therefore, as seen in FIG. 5, the transverse bottom sections 46 are connected to the transverse ribs 34 where the bottom section 46 meets the transverse ribs but not at the recessed portions 40 of the transverse ribs. Thus, as viewed from the top (FIG. 1) the spacing sections 24–32 with the transverse and longitudinal ribs and transverse bottom sections form what looks like a plurality of cubicles throughout the pallet.

The cubicles adjacent the opposite sides and the center, designated by the letter A, are closed at the bottom except for openings 48 in the bottom sections 46. The two other cubicles, designated by the letter B, are not closed at the bottom in view of the formation of the recessed or open spaces in the transverse ribs. The bottom section 46 is wider adjacent the two outer sides and the center where it forms the cubicles A than is the portion adjacent the recessed portions where it forms the cubicles B.

The opposite ends of the pallet have end walls 50 which have the same general formation as the transverse ribs 34 and the end walls 50 are likewise provided with recessed portions 52 in alinement with the recessed portions 40 of the ribs 34. Extending from the transverse rib 34 adjacent each of the opposite ends to the end walls 50 is a vertically extending but inclined connecting wall 54. When viewing the bottom of the pallet, as shown in FIG. 4, the longitudinal and transverse ribs and the undersurface of the top surface sections 13–22 form a plurality of cubicle-like formations.

There is thus provided a pallet construction that may be integrally molded of a plastic material and produced by an injection molding machine as a single integral unit, which is economical to produce, and has great strength by virtue of the construction shown and described. The pallets may be stacked one upon the other. If stacked outside of a building and rained upon the water will not be contained in the cubicle formations as by virtue of the openings the water will flow out therefrom.

It will be understood that various changes and modifications may be made from the foregoing without departing from the spirit and scope of the appended claims.

What is claimed is:

1. An integrally molded pallet of plastic material comprising, a top surface formed of spaced top surface sections and alternate open top spacing sections, spaced parallel ribs extending longitudinally of the pallet and spaced parallel ribs extending transversely of the pallet, said longitudinally and transversely extending ribs extending below the top surface sections with the spaced transversely extending ribs extending at right angles to the longitudinal ribs, said longitudinal and transversely extending ribs being recessed to receive the fork of a lift truck at any of the opposite ends or sides of the pallet.

2. A pallet as defined in claim 1 in which the transversely extending ribs are contiguous to the spaced top surface sections and the said transversely extending ribs incline inwardly from the top toward the bottom and with transversely extending bottom walls connected to said transversely extending ribs and with the longitudinally extending ribs extending between and connected to the spaced top surface sections.

3. A pallet as defined in claim 2 in which the ribs form a plurality of cubicles between the spaced top sections.

4. A pallet as defined in claim 2 in which the ribs form a plurality of cubicles on the top and bottom of said pallet.

References Cited

UNITED STATES PATENTS

| | | | |
|---|---|---|---|
| 2,991,965 | 7/1961 | Drieborg | 108—58 |
| 3,140,672 | 7/1964 | De Luca | 108—53 |
| 3,187,689 | 6/1965 | Hess | 108—58 |
| 3,187,691 | 6/1965 | Leitzel | 108—58 |
| 3,228,358 | 1/1966 | Sepe et al. | 108—58 |
| 3,277,849 | 10/1966 | Talbot | 108—58 |
| 3,359,929 | 12/1967 | Carlson | 108—58 |
| 3,404,642 | 10/1968 | Belcher et al. | 108—58 |

BOBBY R. GAY, Primary Examiner

GLENN O. FINCH, Assistant Examiner